L. W. HARRIS.
Potato-Digger.

No. 19,849.                                         Patented Apr. 6, 1858.

UNITED STATES PATENT OFFICE.

L. W. HARRIS, OF WATERVILLE, NEW YORK.

IMPROVEMENT IN POTATO-DIGGERS.

Specification forming part of Letters Patent No. 19,849, dated April 6, 1858.

*To all whom it may concern:*

Be it known that I, LEWIS W. HARRIS, of Waterville, in the county of Oneida and State of New York, have invented a new and Improved Machine for Digging Potatoes and other Edible Tuberous and Bulbous Roots; and I do hereby declare that the following is a full, clear, and exact description of the same, reference being had to the annexed drawings, making a part of this specification, in which—

Figure 2:
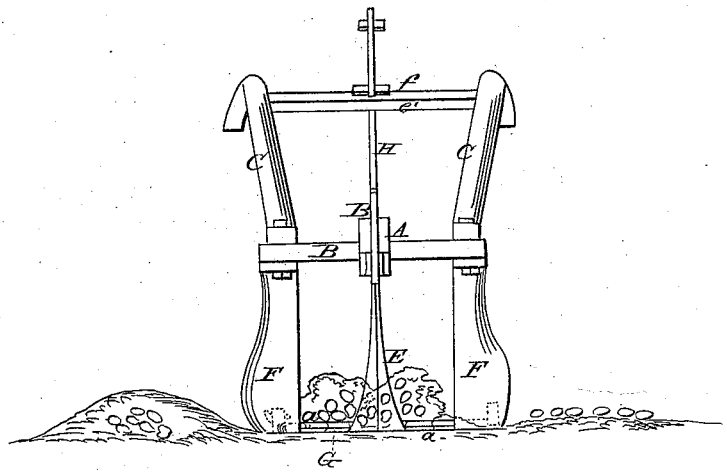
Figure 1:
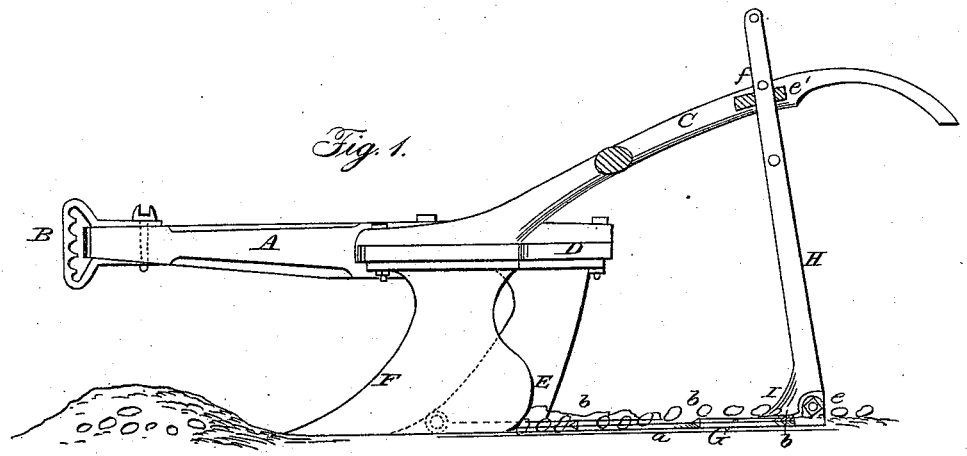
Figure 3:
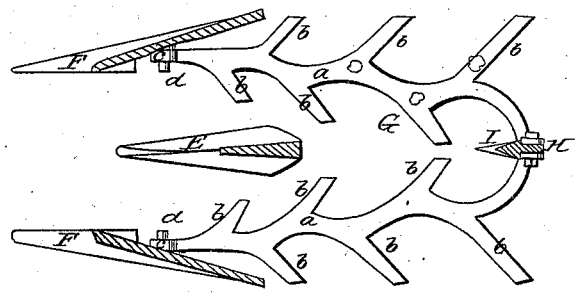

Figure 1 is a side view of my improvement, the handle nearest the eye being removed. Fig. 2 is a front view of the same. Fig. 3 is a detached plan view of the drag and central or opening share.

Similar letters of reference indicate corresponding parts in the several figures.

This invention consists in the employment or use of a drag in connection with a share so arranged that the hills or drills containing the potatoes or other roots will be opened by the share and the roots subjected to the action of the drag, whereby the earth will be leveled and the potatoes or other roots brought to the surface of the ground.

The invention also consists in the employment or use of supplementary shares in connection with the drag and opening-share above mentioned, whereby the sides of the hills or drills are removed or pared off preparatory to the action of the central opening-share and drag, and thereby facilitating in some degree the operation of the latter-named parts.

To enable those skilled in the art to fully understand and construct my invention, I will proceed to describe it.

A represents a beam constructed similarly to an ordinary plow-beam. B is a clevis attached to its outer end, and C C are two handles, which are attached to a horizontal bed or platform, D, to which the back end of the beam A is also attached. The handles C C are constructed similarly to ordinary plow handles.

To the under side of the bed or platform D, and in line with its center, a share, E, is attached. This share may be constructed similarly to an ordinary cultivator tooth or share, or it may be of other form. It should, however, be so formed as to cast the earth at each side of it.

F F are two shares, which are attached to the under side of the bed D, one at each side. These shares have their beveled or inclined surfaces or mold-boards at their outer sides, so that the earth will be thrown outward from said shares. The space between the two shares F F is designed to be nearly equal to the width of the hills or drills in which the potatoes or other roots to be dug are embedded, and the share E is placed centrally between said shares, but a little back of them, so that the shares F F may work in advance of it.

G represents what I term a "drag." This drag may be constructed of malleable cast-iron, and formed of two sinuous or zigzag bars, $a\,a$, provided with arms or lateral projections $b\,b$, as shown in Fig. 3. The front end of each bar $a\,a$ is provided with an eye, $c$, and these eyes are fitted loosely on pins or journals $d$, which project from the inner sides of the lower part of the shares F F. (See Fig. 3.) The back ends of the bars $a\,a$ are connected by a bolt, $e$, to the lower end of a rod, H, the upper end of which passes loosely through a cross-tie, $e'$, of the handles C C, and a pin, $f$, passes transversely through the upper end of the rod H. The lower end of the rod H has a share, I, formed on it.

The operation is as follows: As the machine is drawn along the shares F F pare or cut off the sides of the hills or drills J, and throw the earth into the spaces between, and the share E penetrates the hills or drills, the lower end of the share passing below the potatoes, (shown in red,) and dividing the hill and throwing the earth and potatoes at either side. (See Fig. 2.) The drag G passes along in nearly or quite a horizontal position and about on a level with the lower end of the share E. The drag agitates the earth and potatoes and causes the earth to settle below them, so that as the back end of the drag passes each hill or spot where the potatoes were embedded, the whole of them (the potatoes) will be exposed at the surface of the earth, and the earth will be leveled around them, the hills or drills being completely demolished and the spaces that were between them filled up by the portions of earth that previously formed the hills or drills. The operation of the drag G as a separator is due to the tendency of the earth to settle down when agitated and pulverized. It is quicker in its action than the potatoes, and consequently when both are agitated together the earth will settle quickly and leave the potatoes at the surface.

From the above description of parts it will be readily seen that the drag G should be of such form as to agitate the ground below the potatoes the whole width of the hills or drills, and consequently the form is not essential so long as this function be properly performed. Various forms might be used that would probably operate equally as well as the one herein shown and described. It will also be seen that various forms of shares E might be used for opening the hills or drills. It is essential, however, that an opening share or device of some kind be used in connection with the drag, and that the drag be of such form or construction as to agitate the earth and potatoes below the surface of the earth sufficiently to effect the separation described.

I would remark that the shares F F assist in the leveling of the earth, and to a certain extent facilitate the operation of the share E and drag G, by removing the earth adjoining the potatoes or roots to be dug or exposed. I would also remark that the rod H serves as a support to the back end of the drag, and causes the same to rise with the implement when the latter is raised by the operator to clear obstructions, and that the front end of the drag is connected by joints to the shares or to the machine, so that it may yield or give to the inequalities of the ground. The share I serves as a pulverizer and to cast off weeds and other substances from the back end of the drag.

Having thus described my invention, what I claim as new, and desire to secure by Letters Patent, is—

1. The employment or use of a share, E, and drag G, so constructed and arranged to operate as and for the purpose herein shown and described.

2. In combination with the share E and drag G, the supplementary shares F F, arranged to operate conjointly with the drag and opening-share, as and for the purpose specified.

LEWIS W. HARRIS.

Witnesses:
J. T. BUCKLEY,
MICH. HUGHES.